United States Patent
Uehara et al.

(10) Patent No.: US 6,815,104 B2
(45) Date of Patent: Nov. 9, 2004

(54) METHOD FOR CONTROLLING FLOW RATE OF OXIDIZER IN FUEL CELL SYSTEM

(75) Inventors: Junji Uehara, Utsunomiya (JP);
Kenichiro Ueda, Utsunomiya (JP);
Yoshikazu Murakami, Utsunomiya (JP); Masanori Hayashi, Utsunomiya (JP); Yuji Matsumoto, Shioya-gun (JP);
Daishi Igarashi, Shioya-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/722,690

(22) Filed: Nov. 24, 2003

(65) Prior Publication Data

US 2004/0161643 A1 Aug. 19, 2004

(30) Foreign Application Priority Data

Nov. 27, 2002 (JP) ........................................ 2002-344034

(51) Int. Cl.[7] .............................................. H01M 8/04
(52) U.S. Cl. ............................ 429/13; 429/22; 429/23; 429/25
(58) Field of Search .............................. 429/13, 22, 23, 429/25

(56) References Cited

U.S. PATENT DOCUMENTS 5,991,670 A 11/1999 Mufford et al.
6,110,611 A 8/2000 Stuhler et al.
6,180,271 B1 1/2001 Stuhler et al.
6,569,551 B2 * 5/2003 Skala et al. ................... 429/17
6,602,628 B2 * 8/2003 Ueda et al. .................... 429/25
2003/0203247 A1 * 10/2003 Keskula et al. ............... 429/13

FOREIGN PATENT DOCUMENTS

| DE | 101 18 151 A1 | 12/2001 |
| EP | 0 633 157 A1 | 1/1995 |
| JP | 07-249421 | 9/1995 |

* cited by examiner

Primary Examiner—John S. Maples
(74) Attorney, Agent, or Firm—Lahive & Cockfield, LLP; Anthony A. Laurentano, Esq.

(57) ABSTRACT

A method for controlling the flow rate of an oxidizer in a fuel cell system having a fuel cell stack being supplied with fuel and the oxidizer, a compressor for supplying the oxidizer to the fuel cell stack, a back pressure valve for controlling pressure of the oxidizer, and a control device for controlling the fuel cell stack, the compressor, and the back pressure valve. The method includes the steps of calculating an oxidizer pressure command and an oxidizer flow rate command based on a given electrical current command, comparing a first flow rate that is defined as an upper limit of oxidizer flow rate and a second flow rate that is defined as a lower limit of oxidizer flow rate with the oxidizer flow rate command, and regulating the oxidizer flow rate command so as to be limited within a range from the second flow rate to the first flow rate.

4 Claims, 3 Drawing Sheets

TABLE 1: TABLE FOR UPPER LIMIT OF AIR FLOW RATE

TABLE 2: TABLE FOR LOWER LIMIT OF AIR FLOW RATE

METHOD FOR CONTROLLING FLOW RATE OF OXIDIZER IN FUEL CELL SYSTEM

BACKGROUND OF THE INVENTION

1. Field of the Invention

The present invention relates to a method for controlling the flow rate of an oxidizer in a fuel cell system.

Priority is claimed on Japanese Patent Application No. 2002-344034, filed Nov. 27, 2002, the content of which is incorporated herein by reference.

2. Description of Related Art

Among fuel cells mounted in fuel cell powered vehicles or the like, a type of fuel cell is known in which a solid polymer electrolyte membrane and anode and cathode electrodes that together sandwich the solid polymer electrolyte membrane are provided, and a fuel gas (e.g., hydrogen gas) is supplied to the anode electrode, and an oxidizing gas (e.g., oxygen or air) is supplied to the cathode electrode so that electrical energy is generated through an oxidation-reduction reaction of the fuel gas and the oxidizing gas.

A fuel cell system incorporating the above type of fuel cell is disclosed in Japanese Unexamined Patent Application, First Publication No. Hei 07-249421, in which the pressure difference between the anode area and the cathode area of the fuel cell is made controllable depending on the flow rate of the gas supplied to the cathode electrode and the output electrical power.

In such a fuel cell system, when air must be supplied under conditions of high flow rate and low pressure, or under conditions of small flow rate and high pressure, during a transitional state in which operation conditions of the fuel cell system vary, an excessive load is applied on the air compressor of the fuel cell system, and the electrolyte membrane is placed under severe conditions because the pressure difference cannot be controlled, which are not preferred in terms of maintaining reliability of the fuel cell.

SUMMARY OF THE INVENTION

In view of the above circumstances, an object of the present invention is to provide a method for controlling the flow rate of an oxidizer in a fuel cell system by which reliability of the fuel cell can be maintained even when the fuel cell system is placed in a transitional state in which operation conditions of the fuel cell system vary.

In order to achieve the above object, the present invention provides a method for controlling the flow rate of an oxidizer in a fuel cell system having a fuel cell stack performing power generation by being supplied with fuel and the oxidizer, a compressor for supplying the oxidizer to the fuel cell stack, a back pressure valve for controlling pressure of the oxidizer which is disposed in a flow passage of the oxidizer and downstream of the fuel cell stack, and a control device for controlling the fuel cell stack, the compressor, and the back pressure valve, the method including the steps of: calculating an oxidizer pressure command and an oxidizer flow rate command based on a given electrical current command using the control device; comparing a first flow rate that is defined as an upper limit of oxidizer flow rate corresponding to the oxidizer pressure command and a second flow rate that is defined as a lower limit of oxidizer flow rate corresponding to the oxidizer pressure command with the oxidizer flow rate command; and regulating the oxidizer flow rate command so as to be limited within a range from the second flow rate to the first flow rate.

According to the above method for controlling the flow rate of an oxidizer in a fuel cell system, the flow rate of the oxidizer is limited within the range from the first flow rate to the second flow rate, i.e., within a range which is easily achievable by the compressor of the fuel cell system even when the operation state of the fuel cell system changes and pressure and flow rate requirements of the oxidizer to be supplied to the fuel cell stack are changed; therefore, the compressor operates under mild conditions and the function thereof is maintained. Moreover, because the pressure difference between the anode area and the cathode area of the fuel cell unit can be controlled so as to be limited within an appropriate range, the electrolyte membrane of the fuel cell unit can be preferably protected, and reliability of the fuel cell stack can be improved.

In the above step of controlling the oxidizer flow rate command, the oxidizer flow rate command may be corrected to the first flow rate when the oxidizer flow rate command is greater than the first flow rate, and the oxidizer flow rate command may be corrected to the second flow rate when the oxidizer flow rate command is less than the second flow rate.

DETAILED DESCRIPTION OF THE INVENTION

An embodiment of a fuel cell system of according to the present invention will be explained below with reference to FIG. 1.

Figure 1:
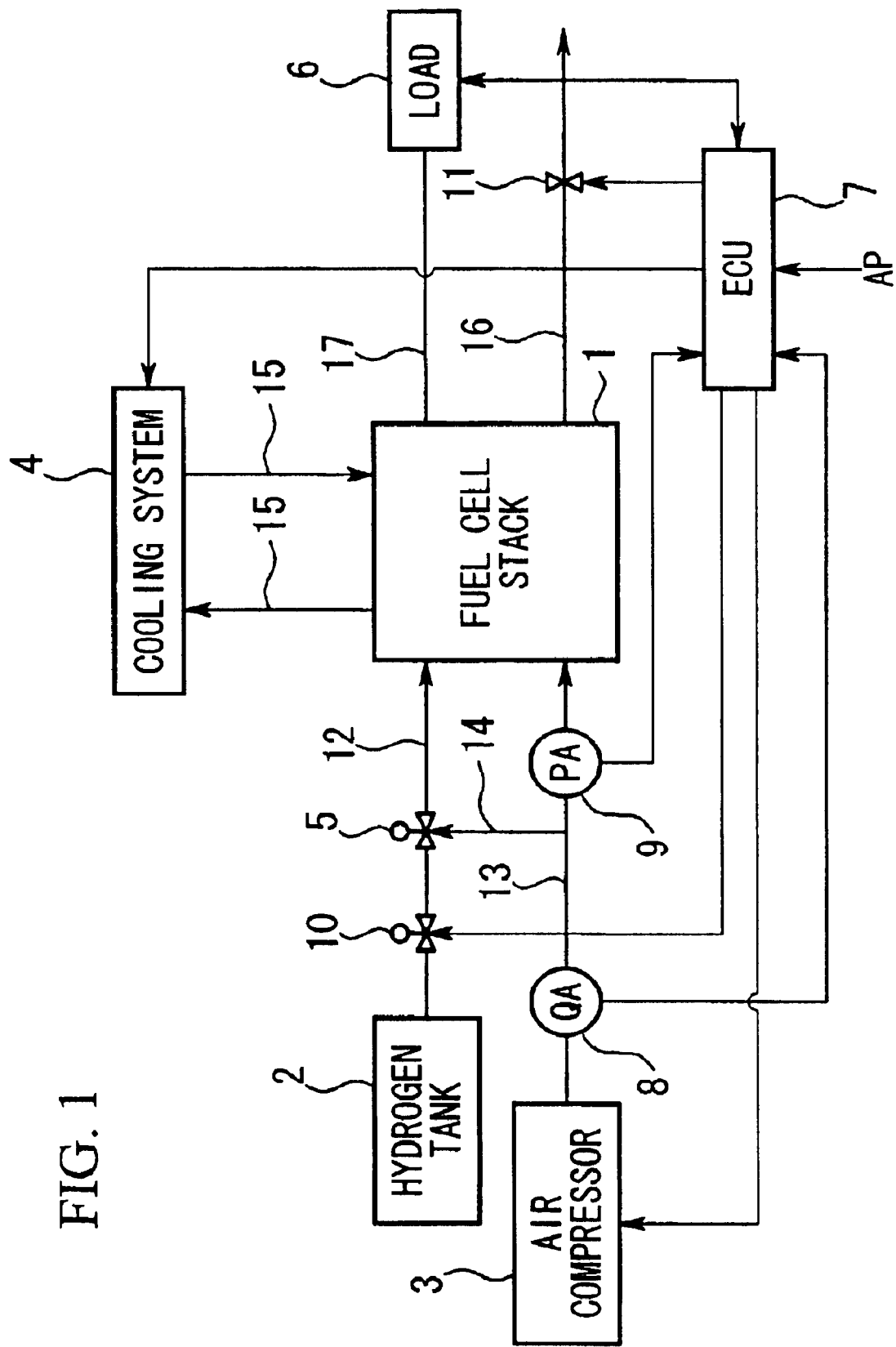
FIG. 1 is a schematic diagram showing the constitution of an embodiment of a fuel cell system according to the present invention.

FIG. 1 is a schematic diagram showing the constitution of the embodiment of the fuel cell system according to the present invention.

A fuel cell stack 1 includes a stacked body formed by stacking fuel cell units each of which includes a solid polymer electrolyte membrane, such as a solid polymer ion-exchange membrane, and an anode electrode and a cathode electrode that together sandwich the solid polymer electrolyte membrane.

A high pressure hydrogen supply system 2 is connected to the fuel cell stack 1 via a hydrogen gas supply flow passage 12. The high pressure hydrogen supply system 2 includes a hydrogen supply source, such as a hydrogen tank, from which a hydrogen gas is supplied to the anode electrode of the fuel cell stack 1 via the hydrogen gas supply flow passage 12.

An air compressor 3 is connected to the fuel cell stack 1 via an air supply flow passage 13. The air compressor 3 supplies air (i.e., an oxidizing gas) to the cathode electrode of the fuel cell stack 1 via the air supply flow passage 13.

In the fuel cell stack 1, when a hydrogen gas as fuel is supplied to the anode area and air (air containing oxygen) as an oxidizer is supplied to the cathode area, hydrogen ions are produced in the anode area by a catalytic reaction, and the hydrogen ions move to the cathode area where an electrochemical reaction with oxygen occurs, producing water.

The air, which has been used for power generation, is discharged as an air off-gas from the cathode area of the fuel cell stack 1 into an air discharge flow passage 16 which is disposed downstream the fuel cell stack 1. The air discharge flow passage 16 is provided with a back pressure valve 11 which controls air pressure in the fuel cell stack 1.

A hydrogen gas, which was supplied to the fuel cell stack 1 for power generation, but did not react therein, is discharged as a hydrogen off-gas from the anode area of the fuel cell stack 1 into a hydrogen off-gas circulation passage (not shown), and is again supplied to the anode area of the fuel cell stack 1.

A cooling system 4 is connected to the fuel cell stack 1 via a cooling water flow passage 15. The cooling system 4 includes a pump (not shown) for circulating cooling water as a cooling medium, and supplies cooling water to the areas between the fuel cell units of the fuel cell stack 1 via the cooling water flow passage 15. By circulating cooling water through the fuel cell stack 1 as described above, an increase in the temperature of the fuel cell stack 1 due to heat during power generation is restrained, and the fuel cell stack 1 can be operated under conditions with appropriate temperature.

The hydrogen gas supply flow passage 12 is provided with a shutoff valve 10 and a pressure control valve 5. The flow rate of the hydrogen gas is regulated by controlling the shutoff valve 10. The pressure control valve 5, which is connected to a signal pressure flow passage 14 branching off the air supply flow passage 13, controls the pressure of the hydrogen gas being supplied to the anode area so that the pressure difference between the hydrogen gas and the air being supplied to the cathode area is limited within an appropriate range.

The air supply flow passage 13 is provided with a flow rate sensor 8 for measuring the flow rate of the air and a pressure sensor 9 for measuring the pressure of the air.

A load 6 is connected to the fuel cell stack 1 via electrical lines 17, so that electrical power generated in the fuel cell stack 1 is supplied to the load 6.

The fuel cell system according to the present embodiment includes a control device (an ECU (Electric Control Unit)) 7. The ECU 7 controls the air compressor 3, the cooling system 4, the load 6, the shutoff valve 10, and the back pressure valve 11, depending on measured values of the sensors 8 and 9 (i.e., flow rate QA and pressure PA), a state of load 6, an opening degree AP of the accelerator, etc.

Next, the air flow rate control operation for the fuel system configured as described above will be explained below with reference to FIG. 2.

Figure 2:
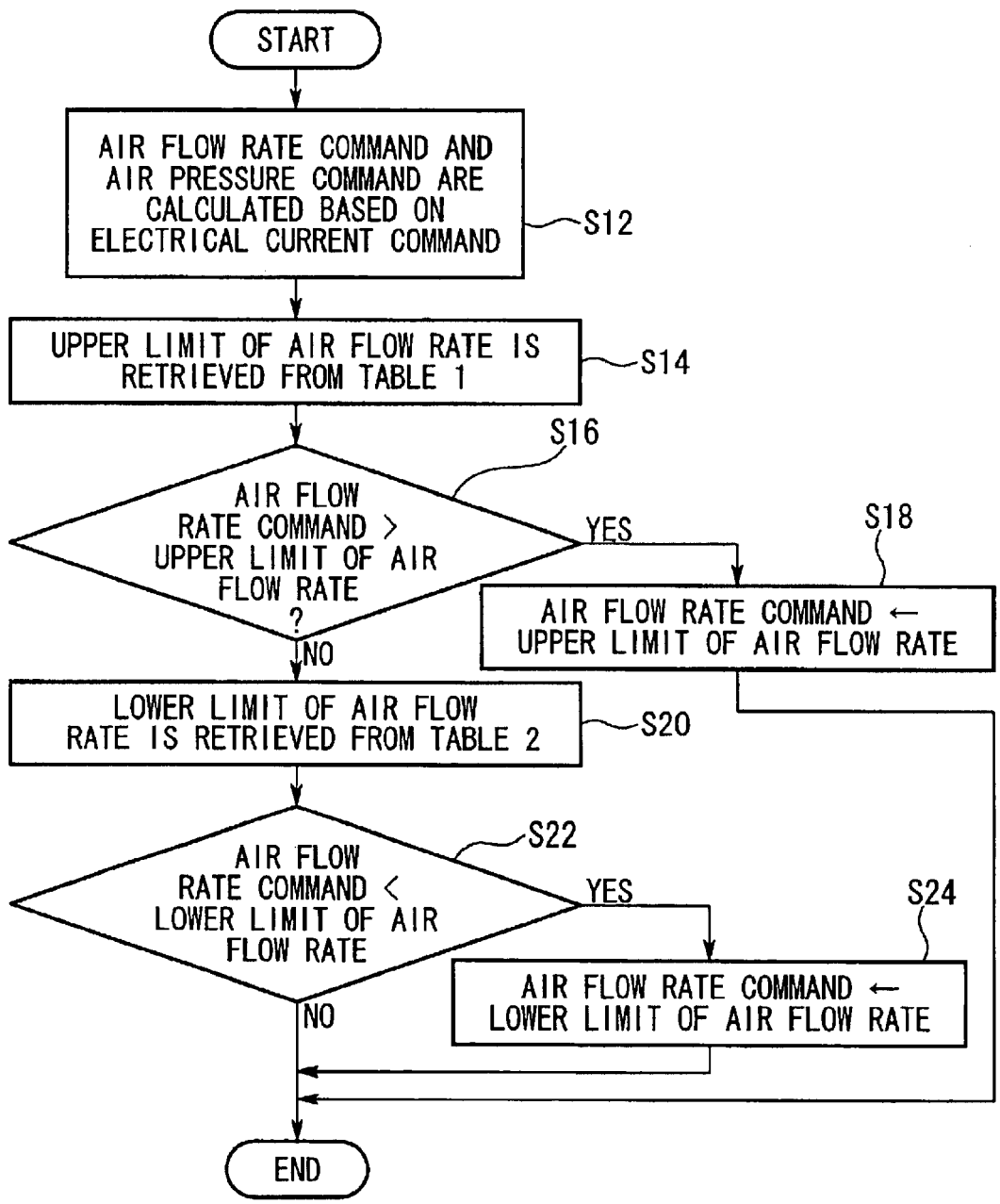
FIG. 2 is a flowchart showing an air flow rate control operation for the fuel system shown in FIG. 1.

FIG. 2 is a flowchart showing the control operation for the fuel system shown in FIG. 1. In step S12, an air pressure command and an air flow rate command for the air supplied to the fuel cell stack 1 are calculated based on an electrical current command which is determined depending on the opening degree AP of the accelerator and the state of the load 6. The electrical current command is determined in accordance with electrical power which is presently required in the vehicle. In step S14, an upper limit of air flow rate corresponding to the air pressure command is retrieved from Table 1 (see FIG. 4).

Figure 4:
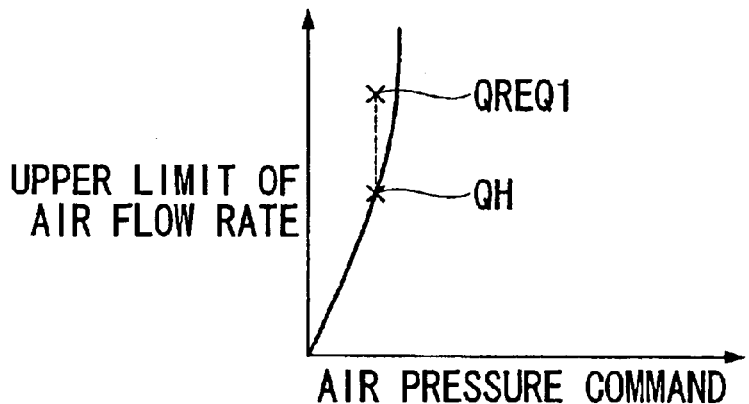
FIG. 4 is a graph drawn based on Table 1 defining the relationship between upper limit of air flow rate and an air pressure command, which is referenced in the flowchart of FIG. 2.

In step S16, it is determined whether the air flow rate command is greater than the upper limit of air flow rate. When the result of the determination is "YES", the operation proceeds to step S18, in which the air flow rate command is corrected to the upper limit of air flow rate, and the series of the operations is terminated. More specifically, as shown in FIG. 4, when the flow rate command QREQ1 is greater than the upper limit of air flow rate QH corresponding to the air pressure command, the flow rate command QREQ1 is corrected to the upper limit of air flow rate QH.

Figure 3:
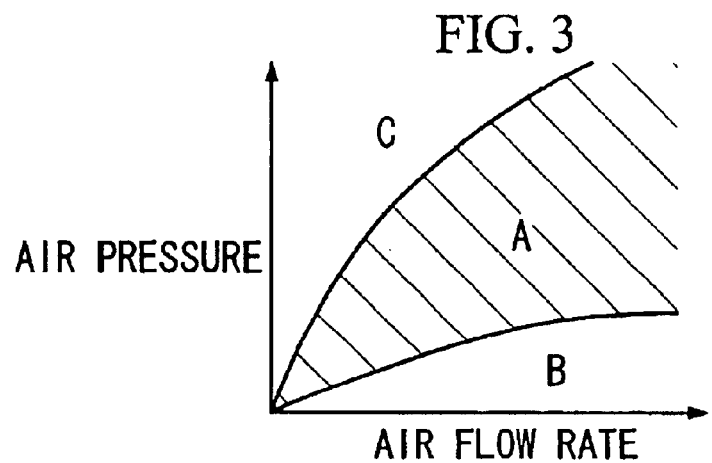
FIG. 3 is a graph showing the relationship between air pressure and air flow rate.

FIG. 3 is a graph showing the relationship between air pressure and air flow rate. In FIG. 3, a zone A is a zone in which the combinations of air pressure and air flow rate are practically achievable by the air compressor 3, a zone B is a high flow rate and low pressure zone, and a zone C is a small flow rate and high pressure zone.

The above case in which the flow rate command is greater than the upper limit of air flow rate corresponds to the high flow rate and low pressure zone B. If the air compressor 3 is used to achieve the combinations in the zone B, an excessive load would be applied thereto because the pressure in the fuel cell system is increased due to pressure loss in the system even when the back pressure valve 11 is completely open. In this embodiment, the air compressor 3 is prevented from having an excessive load by correcting the flow rate command to the upper limit of air flow rate as explained above.

Figure 5:
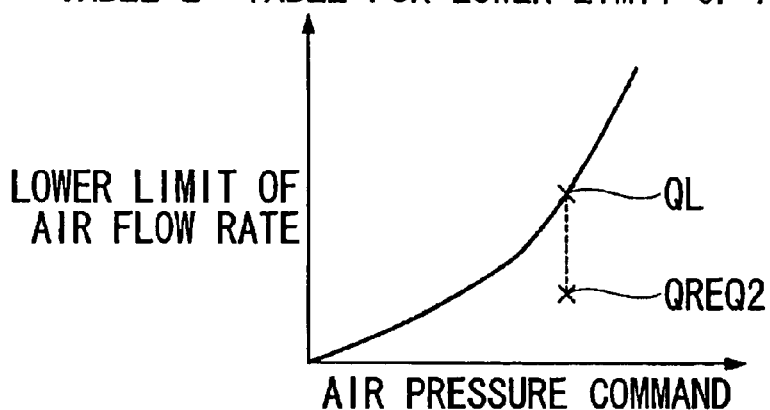
FIG. 5 is a graph drawn based on Table 2 defining the relationship between lower limit of air flow rate and an air pressure command, which is referenced in the flowchart of FIG. 2.

When the result of the determination in step S16 is "NO", the operation proceeds to step S20, in which a lower limit of air flow rate corresponding to the air pressure command is retrieved from Table 2 (see FIG. 5). In step S22, it is determined whether the air flow rate command is less than the lower limit of air flow rate. When the result of the determination is "YES", the operation proceeds to step S24. In contrast, when the result of the determination is "NO", the series of the operations is terminated. More specifically, as shown in FIG. 5, when the flow rate command QREQ2 is less than the lower limit of air flow rate QL corresponding to the air pressure command, the flow rate command QREQ2 is corrected to the lower limit of air flow rate QL.

The above case in which the flow rate command is less than the lower limit of air flow rate corresponds to the small flow rate and high pressure zone C. If the air compressor 3 is used to achieve the combinations in the zone C, an excessive load would be applied thereto because the pressure in the fuel cell system is decreased due to leakage from the back pressure valve 11 even when the back pressure valve 11 is completely closed. In this embodiment, the air compressor 3 is prevented from having an excessive load by correcting the flow rate command to the lower limit of air flow rate as explained above. Moreover, because the pressure difference between the anode area and the cathode area of the fuel cell unit can be controlled so as to be limited within an appropriate range, the electrolyte membrane of each of the fuel cell units can be preferably protected.

While preferred embodiments of the invention have been described and illustrated above, it should be understood that these are exemplary of the invention and are not to be considered as limiting. For example, the fuel cell system of the present embodiment may be used for a fuel cell powered motorcycle or a fuel cell powered robot, in addition to the fuel cell powered vehicle. Moreover, the fuel cell system of the present embodiment may be of a stationary type, or be of a portable type.

Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A method for controlling the flow rate of an oxidizer in a fuel cell system having a fuel cell stack performing power generation by being supplied with fuel and the oxidizer, a compressor for supplying the oxidizer to the fuel cell stack, a back pressure valve for controlling pressure of the oxidizer which is disposed in a flow passage of the oxidizer and downstream of the fuel cell stack, and a control device for controlling the fuel cell stack, the compressor, and the back pressure valve, the method comprising the steps of:

calculating an oxidizer pressure command and an oxidizer flow rate command based on a given electrical current command using the control device;

comparing a first flow rate that is defined as an upper limit of oxidizer flow rate corresponding to the oxidizer pressure command and a second flow rate that is defined as a lower limit of oxidizer flow rate corresponding to the oxidizer pressure command with the oxidizer flow rate command; and regulating the oxidizer flow rate command so as to be limited within a range from the second flow rate to the first flow rate.

2. A method for controlling the flow rate of an oxidizer in a fuel cell system according to claim 1, wherein, in the step of controlling the oxidizer flow rate command, the oxidizer flow rate command is corrected to the first flow rate when the oxidizer flow rate command is greater than the first flow rate.

3. A method for controlling the flow rate of an oxidizer in a fuel cell system according to claim 1, wherein, in the step of controlling the oxidizer flow rate command, the oxidizer flow rate command is corrected to the second flow rate when the oxidizer flow rate command is less than the second flow rate.

4. A method for controlling the flow rate of an oxidizer in a fuel cell system according to claim 1, wherein the fuel cell system is provided in a vehicle, and the electrical current command is determined depending on the opening degree of an accelerator provided in the vehicle.

* * * * *